(12) United States Patent
Costabile et al.

(10) Patent No.: US 11,779,822 B2
(45) Date of Patent: Oct. 10, 2023

(54) MOTION ANALYZER FOR SPORTS EQUIPMENT

(71) Applicant: Icecap Sports Club, Encinitas, CA (US)

(72) Inventors: Kyle Costabile, Encinitas, CA (US); Bryan Costabile, Baltimore, MD (US)

(73) Assignee: Icecap Sports Club, Encinitas, CA (US)

( * ) Notice: Subject to any disclaimer, the term of this patent is extended or adjusted under 35 U.S.C. 154(b) by 57 days.

(21) Appl. No.: 17/463,508

(22) Filed: Aug. 31, 2021

(65) Prior Publication Data

US 2021/0394032 A1   Dec. 23, 2021

(51) Int. Cl.
| | |
|---|---|
| *A63B 60/46* | (2015.01) |
| *G01P 13/00* | (2006.01) |
| *A63B 24/00* | (2006.01) |
| *A63B 102/24* | (2015.01) |
| *A63B 102/14* | (2015.01) |

(52) U.S. Cl.
CPC .......... *A63B 60/46* (2015.10); *A63B 24/0003* (2013.01); *G01P 13/00* (2013.01); *A63B 2102/14* (2015.10); *A63B 2102/24* (2015.10); *A63B 2220/40* (2013.01); *A63B 2220/803* (2013.01); *A63B 2220/833* (2013.01)

(58) Field of Classification Search
CPC . A63B 60/46; A63B 24/0003; A63B 2102/14; A63B 2102/24; A63B 2220/40; A63B 2220/803; A63B 2220/833; G01P 13/00
See application file for complete search history.

(56) References Cited

U.S. PATENT DOCUMENTS

| | | | |
|---|---|---|---|
| 5,056,783 A | 10/1991 | Matcovich et al. | |
| 8,095,855 B2 | 1/2012 | Tan et al. | |
| 8,700,354 B1 | 4/2014 | Bentley et al. | |
| 8,840,483 B1 | 9/2014 | Steusloff et al. | |
| 8,903,521 B2 | 12/2014 | Goree et al. | |
| 8,989,441 B2 | 3/2015 | Han et al. | |
| 9,039,527 B2 | 5/2015 | Bentley et al. | |
| 9,076,041 B2 | 7/2015 | Bentley et al. | |
| 9,401,178 B2 | 7/2016 | Bentley et al. | |
| 9,604,142 B2 | 3/2017 | Bentley et al. | |
| 9,724,578 B2 | 8/2017 | Zhao et al. | |
| 9,746,354 B2 | 8/2017 | Martin et al. | |
| 10,052,539 B1* | 8/2018 | Chou ................. | A63B 69/3632 |
| 10,099,101 B1 | 10/2018 | Dingman et al. | |
| 10,254,139 B2 | 4/2019 | Martin et al. | |
| 10,456,653 B2 | 10/2019 | Thornbrue et al. | |
| 2006/0084516 A1* | 4/2006 | Eyestone ........... | A63B 69/3632 473/219 |

(Continued)

*Primary Examiner* — Francis C Gray
(74) *Attorney, Agent, or Firm* — Jack R. Salvatore (57) ABSTRACT

A motion analyzer for attachment to sports equipment. The motion analyzer may be constructed as one unitary piece and may include a base portion and an upper portion. The motion analyzer may collect and record motion data associated with movement of the sports equipment. The motion data may then be communicated to a mobile application which provides a user with a visual representation of the motion of the sports equipment. Further, a method of manufacturing a motion analyzer for attachment to sports equipment.

19 Claims, 10 Drawing Sheets

(56) References Cited

U.S. PATENT DOCUMENTS

| | | | | |
|---|---|---|---|---|
| 2015/0327386 A1* | 11/2015 | Yarmis | ............... | A63B 24/0062 |
| | | | | 29/829 |
| 2015/0362331 A1* | 12/2015 | Sanchez | ................. | G01R 33/02 |
| | | | | 702/153 |
| 2017/0234706 A1* | 8/2017 | Martin | .................... | G01S 19/19 |
| | | | | 29/407.05 |
| 2017/0312571 A1* | 11/2017 | Thornton | ........... | A63B 69/3632 |
| 2021/0008422 A1* | 1/2021 | Pettersen | ............... | A63B 53/14 |

\* cited by examiner

MOTION ANALYZER FOR SPORTS EQUIPMENT

FIELD OF THE INVENTION

The present disclosure relates to a motion analyzer for attachment to sports equipment. The present disclosure additionally relates to a method of manufacturing a motion analyzer for attachment to sports equipment.

BACKGROUND

Inertial measurement units (IMUs) are measurement devices which are able to obtain a variety of motion-related data from objects in motion. In sports-related uses, IMUs have primarily been used to analyze swing motion of pieces of sports equipment, such as a baseball bat, relative to a stationary user. Accurately tracking motion becomes difficult in sports where a stick is in motion relative to a dynamic user, such as lacrosse or hockey. Existing, motion analysis devices utilize fixed points of reference to track motion, making recreation of the motion difficult when the user moves around.

SUMMARY

The present disclosure describes a motion analyzer for attachment to sports equipment. Generally, the motion analyzer of the present disclosure includes a base portion connected to an upper portion. The upper portion may define a hollow channel configured for attachment to sports equipment, such as a lacrosse stick or hockey stick. The base portion may house a plurality of electronic components, such as a custom circuit board. The custom circuit board may contain a plurality of IMUs which may collect motion data elative to the user's swing as the user swings the piece of sports equipment. The circuit board may further contain a microcontroller capable of aggregating and parsing the motion data obtained from the IMUs. This data may then be transmitted to a mobile application on a user device and provide the user with a recreation of their practice session, giving them suggestions for improving their performance.

In some embodiments, the base portion and the upper portion may be formed as a unitary structure.

In some embodiments, the at least one circuit board may further comprise at least one inertial measurement unit.

In some embodiments, the at least one inertial measurement unit pray include at least one selected from the group consisting of a 3-axis gyroscope, a 3-axis magnetometer, and a 3-axis accelerometer.

In some embodiments, the at least one circuit board may further include a microcontroller, wherein the microcontroller is configured to aggregate motion data collected by the at least one inertial measurement unit.

In some embodiments, the motion analyzer may comprise a thermoplastic material.

In some embodiments, the motion analyzer may comprise an elastomeric material.

In some embodiments, the base portion may further include a charging port, wherein the charging port defines an opening which leads to the circuit board.

In some embodiments, the channel may have a curved cross-section.

In some embodiments, the channel may have a polygonal cross-section.

The motion analyzer of the present disclosure may be configured for attachment to any piece of sports equipment, such as a lacrosse stick, hockey stick, baseball bat, golf club, tennis racquet, or wearable, among other options.

The present disclosure further provides for a method of many manufacturing a motion analyzer in accordance with embodiments of the present disclosure. The motion analyzer of the present disclosure may be formed by any material deposit process. The method of formation may include: depositing a material to form a base portion of the motion analyzer, wherein the base portion defines a recess; pausing material deposition; and depositing a material to form an upper portion of the motion analyzer, wherein the upper portion defines a channel configured for attachment to sports equipment.

DETAILED DESCRIPTION OF THE DRAWINGS

The following detailed description describes modes and methods of carrying out exemplary embodiments of the present disclosure. The description is not to be taken in a limiting sense, but is made for the purpose of illustrating the general principles of some embodiments of the present disclosure. One having ordinary skill in the art will understand the disclosure to encompass alternate embodiments which are covered by the scope of the present disclosure.

Various features are described below that can each be used independently of one another or in combination with other features. Broadly, some embodiments provide a motion analyzer for attachment to sports equipment and a method of manufacturing the same. The motion analyzer may include a circuit board having several inertial measurement units for collecting motion data corresponding to the sports equipment. The circuit board may then transmit the motion data to an application on a user device to provide feedback on the user's performance.

Figure 1:
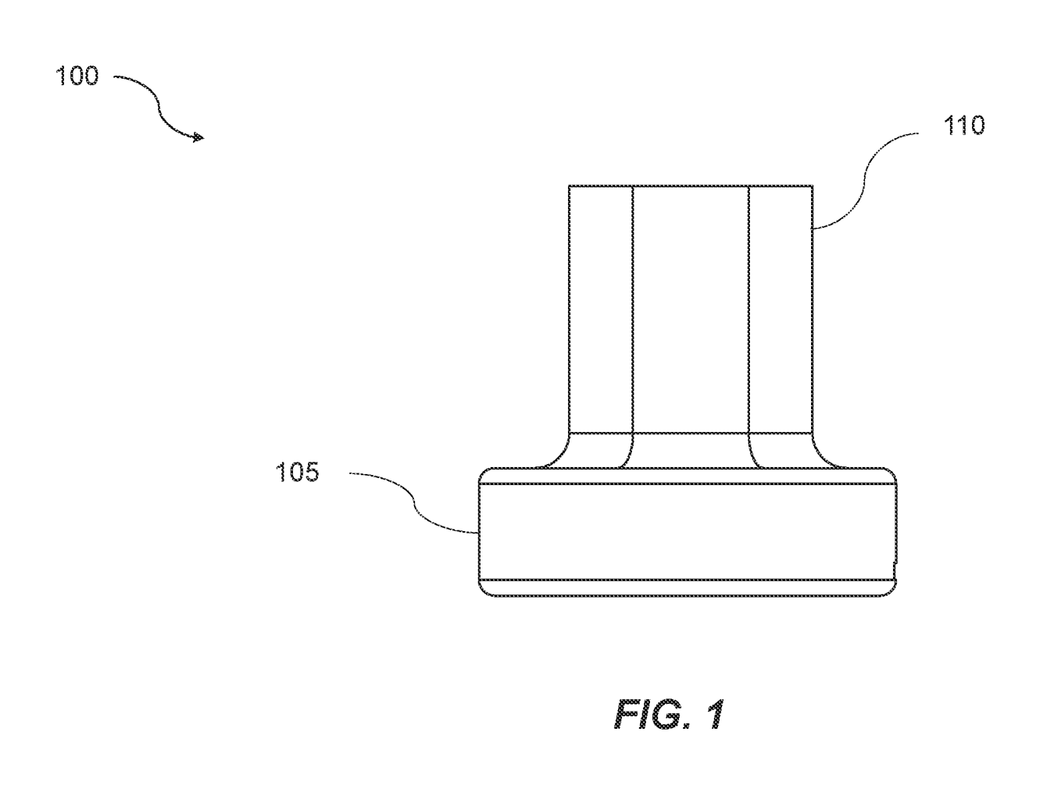
FIG. 1 illustrates a plane view of a motion analyzer in accordance with embodiments of the present disclosure.

FIG. 1 illustrates a front view of a motion analyzer in accordance with embodiments of the present disclosure. Generally, a motion analyzer 100 may include a base portion 105 and an upper portion 110 connected to base portion 105. Motion analyzer 100 may be configured for attachment to sports equipment, including but not limited to a lacrosse stick, a hockey stick, a golf club, a baseball bat, a tennis racquet, or a wearable device (e.g., a smart watch, among other options).

Base portion 105 may have any shape and size suitable for connection to a piece of sports equipment. In some embodiments, base portion 105 may have a curved exterior cross-section (e circular, ovular, or elliptical, among other options). In some embodiments, base portion 105 may have a polygonal exterior cross-section (e.g., three-sided, four-sided, six-sided, or more).

As can be seen, base portion 105 may be connected to upper portion 110. In some embodiments, upper portion 110 may have a smaller exterior cross-section than base portion 105. In some embodiments, upper portion 110 may have a larger exterior cross-section than base portion 105. In further embodiments, upper portion 110 may have the same exterior cross-section as base portion 105. Upper portion 110 may have a curved exterior cross-section (e.g., circular, ovular, or elliptical, among other options). In some embodiments, upper portion 110 may have a polygonal exterior cross-section (e.g., three-sided, four-sided, six-sided or more).

As will be appreciated in light of this disclosure, motion analyzer 100 may be formed from any resilient material suitable for attachment to sports equipment. Motion analyzer 100 may be formed from rigid materials, flexible materials, or a combination of both. In some embodiments, motion analyzer 100 may be formed from thermoplastics (e.g., thermoplastic polyurethane (TPU), polyethylene terephthalate glycol (PETG), polyamide (nylon), and polypropylene (PP), among other options). In some embodiments, motion analyzer 100 may be constructed from elastomeric materials. Motion analyzer 100 may be constructed from resilient, flexible materials which may be capable of being dispensed in any material deposit process.

In some embodiments, base portion 105 and upper portion 110 may be formed as one unitary structure made from the same material. For example, motion analyzer 100 may be one continuous structure made from a thermoplastic material. In some embodiments, base portion 105 and upper portion 110 may be constructed from a plurality of pieces which may be attached together. In these and other embodiments, base portion 105 and upper portion 110 may be formed from two or more different materials. For example, base portion 105 may be formed from a thermoplastic material and upper portion 110 may be formed from an elastomeric material. In these and other embodiments, base portion 105 and upper portion 110 may be attached via adhesive, mechanical fasteners, threaded engagement, chemical bonding, hook and loop fasteners, or male-female connectors, among other options.

Figure 2:
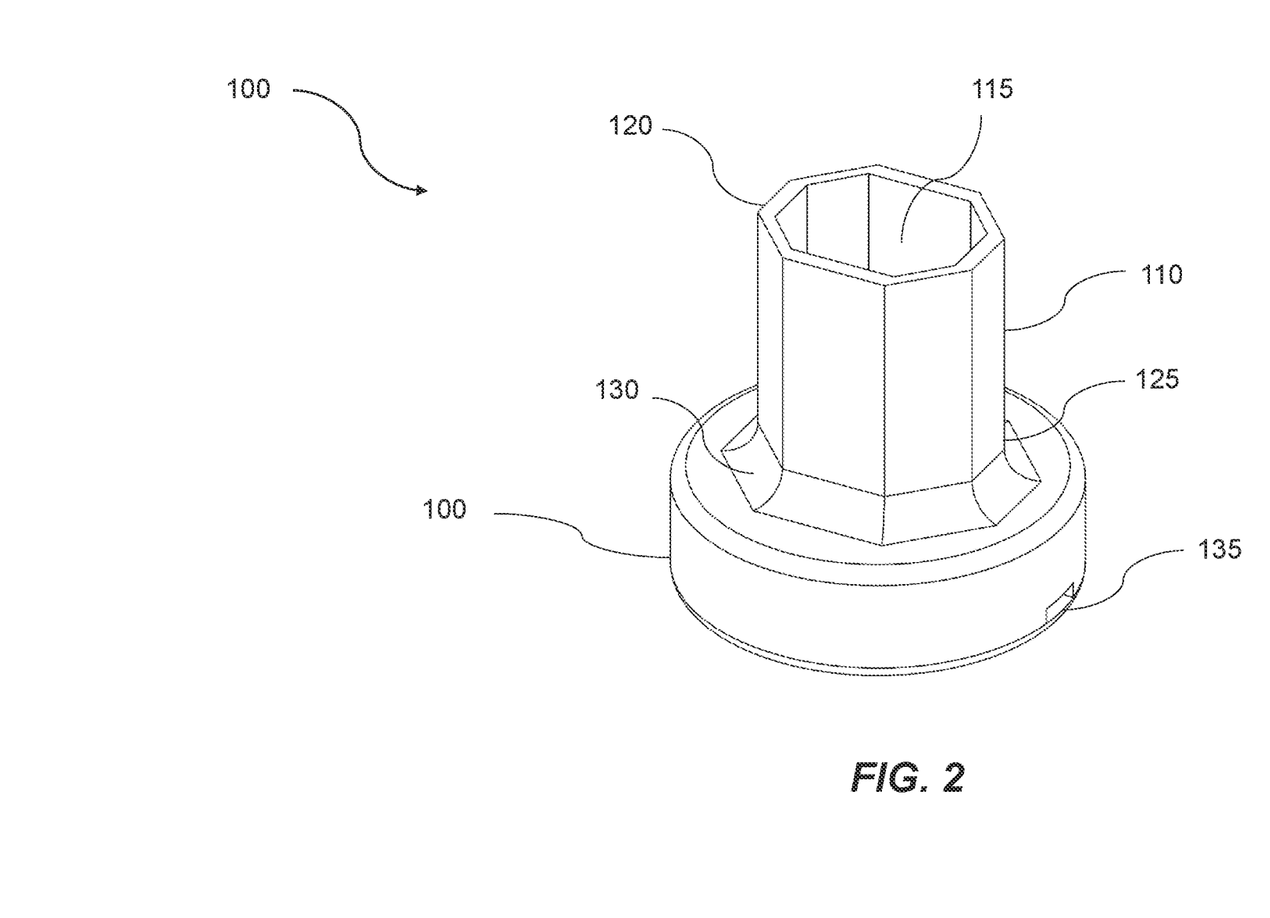
FIG. 2 illustrates a perspective view of the motion analyzer of FIG. 1.

FIG. 2 illustrates a perspective view of the motion analyzer of FIG. 1. As can be seen, upper portion 110 may define a hollow channel 115. Generally, channel 115 may be configured to receive sports equipment. For example, hollow region 115 may have a shape and size such that the shaft a lacrosse stick may be received by channel 115. By receiving sports equipment with channel 115, motion analyzer 100 may attach to any suitable piece of sports equipment.

Upper portion 110 may include a top end 120 and a bottom end 125. Channel region 115 may extend from an opening at top end 120 of upper portion 110 to bottom end 125 of upper portion 110, In some embodiments, bottom end 125 may interface directly with base portion 105. In some embodiments, bottom end 125 and base portion 105 may be connected by a fillet 130. Fillet 130 may be formed from the same material as bottom portion 105 and/or upper portion 110. In some embodiments, fillet 130 may be formed from a different material than bottom portion 105 and upper portion 110.

Fillet 130 may provide a curved contour at a connection point between upper portion 110 and base portion 105. In some embodiments, fillet 130 may be formed as a unitary structure with bottom portion 105 and upper portion 110 such that the three components form one continuous structure. In some embodiments, fillet 130 may be fitted over motion analyzer 100. For example, fillet 130 may be slid over upper portion 110 and pressed against bottom portion 105.

As illustrated, channel 115 may have the same interior cross-section (i.e., the same shape) as the exterior cross-section of upper portion 110. In some embodiments, channel 115 may have a different interior cross-section (i.e., a different shape) as the exterior cross-section of upper portion 110. For example, in one embodiment, channel 115 may be defined by a square interior cross-section, yet upper portion 110 may have a circular exterior cross-section.

Base portion 105 may include a charging port 135. As will be discussed in detail, charging port 135 may define an opening which may be configured to receive an electrical connection. In some embodiments, motion analyzer 100 may include more than one charging port 135. Charging port 135 may lead to a charging header on a circuit board housed within motion analyzer 100.

Figure 3:
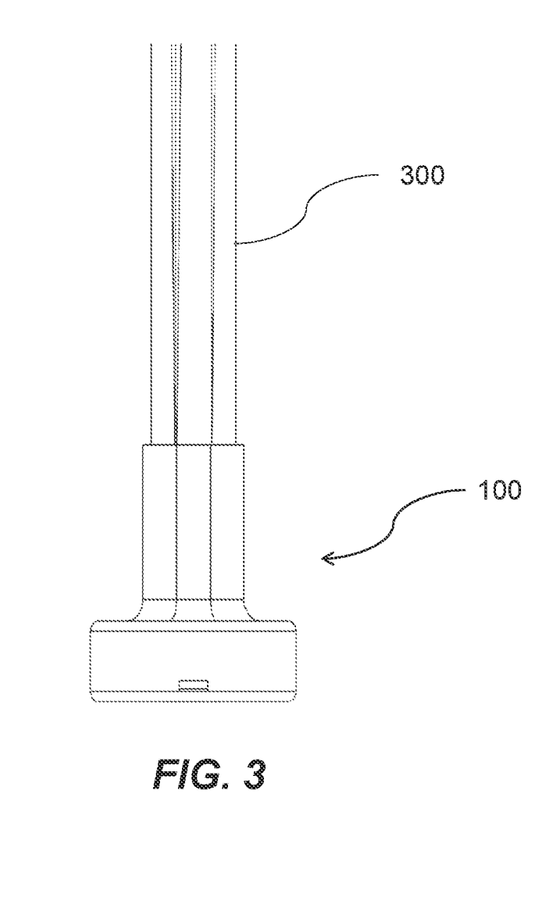
FIG. 3 illustrates a plane view of a motion analyzer attached to a piece of sports equipment in accordance with embodiments of the present disclosure.

FIG. 3 illustrates a plane view of a motion analyzer attached to sports equipment in accordance with embodiments of the present disclosure. As will be appreciated in light of this disclosure, motion analyzer 100 may be configured to receive the end of a piece of sports equipment 300. In some embodiments, sports equipment 300 may be a lacrosse stick. In some embodiments, sports equipment 300 may be a hockey stick. Sports equipment 300 may additionally be a baseball bat, a golf club, a tennis racquet, or a wearable, among other options.

Motion analyzer 100 may be configured and sized such that motion analyzer 100 may be attached to sports equipment 300 simply by pressing motion analyzer 100 on to a corresponding section of sports equipment 300. For example, an end user may receive motion analyzer 100 as one unitary structure in packaging. Sports equipment 300 may be a lacrosse stick. The end user may remove motion analyzer 100 from the packaging and press motion analyzer 100 on to the butt end of a lacrosse stick. Motion analyzer 100 may be configured such that pressing motion analyzer 100 on to the lacrosse stick will create a tight connection between motion analyzer 100 and the butt end of the lacrosse stick. The dimensions of motion analyzer 100 relative to sports equipment 300 may allow motion analyzer 100 to securely fasten to sports equipment 300, allowing the user to conduct a playing session without motion analyzer 100 disconnecting from sports equipment 300.

In some embodiments, motion analyzer 100 may be fastened to sports equipment 300 by other fastening means, including but not limited to adhesive, mechanical fasteners, hook and loop fasteners, threaded engagement, or male-female attachment means, among other options. In some embodiments, motion analyzer 100 may be permanently attached to sports equipment 300.

Figure 4:
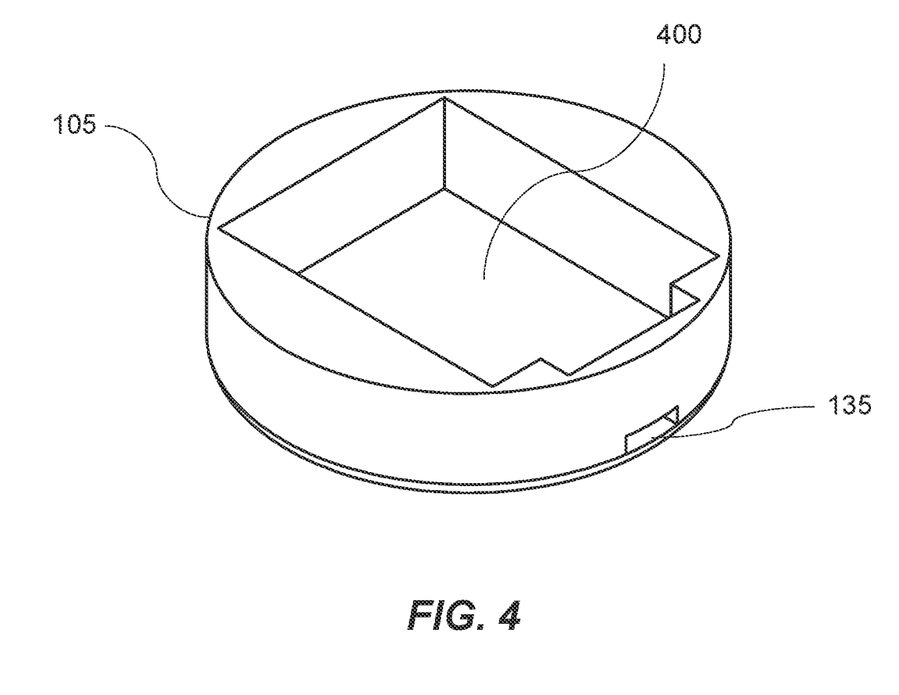
FIG. 4 illustrates a perspective view of a bottom portion of a motion analyzer in accordance with embodiments of the present disclosure.

FIG. 4 illustrates a perspective view of a base portion of a motion analyzer in accordance with embodiments of the present disclosure. As can be seen, base portion 105 may define a recess 400. Generally, recess 400 may be configured to house one or more electronic components.

Recess 400 may have a cross-section which is smaller than the exterior cross-section of base portion 105. In some embodiments, recess 400 may have a curved cross-section (e.g., circular, ovular, or elliptical, among other options). In some embodiments, recess 400 may have a polygonal cross-section (e.g., three-sided, four-sided, five-sided, six-sided, or more). As illustrated, recess 400 may have an irregular cross section.

As will be discussed, recess 400 may be configured to house at least one electronic component. Base portion 105 may include charging port 135. Charging port 135 may define an opening which leads from an exterior surface of base portion 105 to recess 400. As will be appreciated in light of the present disclosure, charging port 400 may allow for at least one electronic component housed within recess 400 to be connected to an external power source or external device, such as a computer, mobile device, tablet, or external display, among other options.

The motion analyzer described in embodiments of the present disclosure may be attached to a piece of sports equipment and used to collect and record motion data relative to the movement of the sports equipment during a defined length of performance (or "session"). The motion analyzer may then process the motion data and send an analysis of the session to a user device. The user device may then present the user with a visual recreation of the practice session.

For example, a motion analyzer in accordance with embodiments of the present disclosure may be attached to the end of a lacrosse stick. A user may then partake in a practice session in which the motion analyzer collects and records motion data relating to the user's shots throughout the session. This motion data is collected, recorded, processed and transmitted to an external device via at least one electronic component housed within the recess of the motion analyzer. The data may help the user improve their performance by recreating the motion of the user's swings on the user device.

Figure 5:
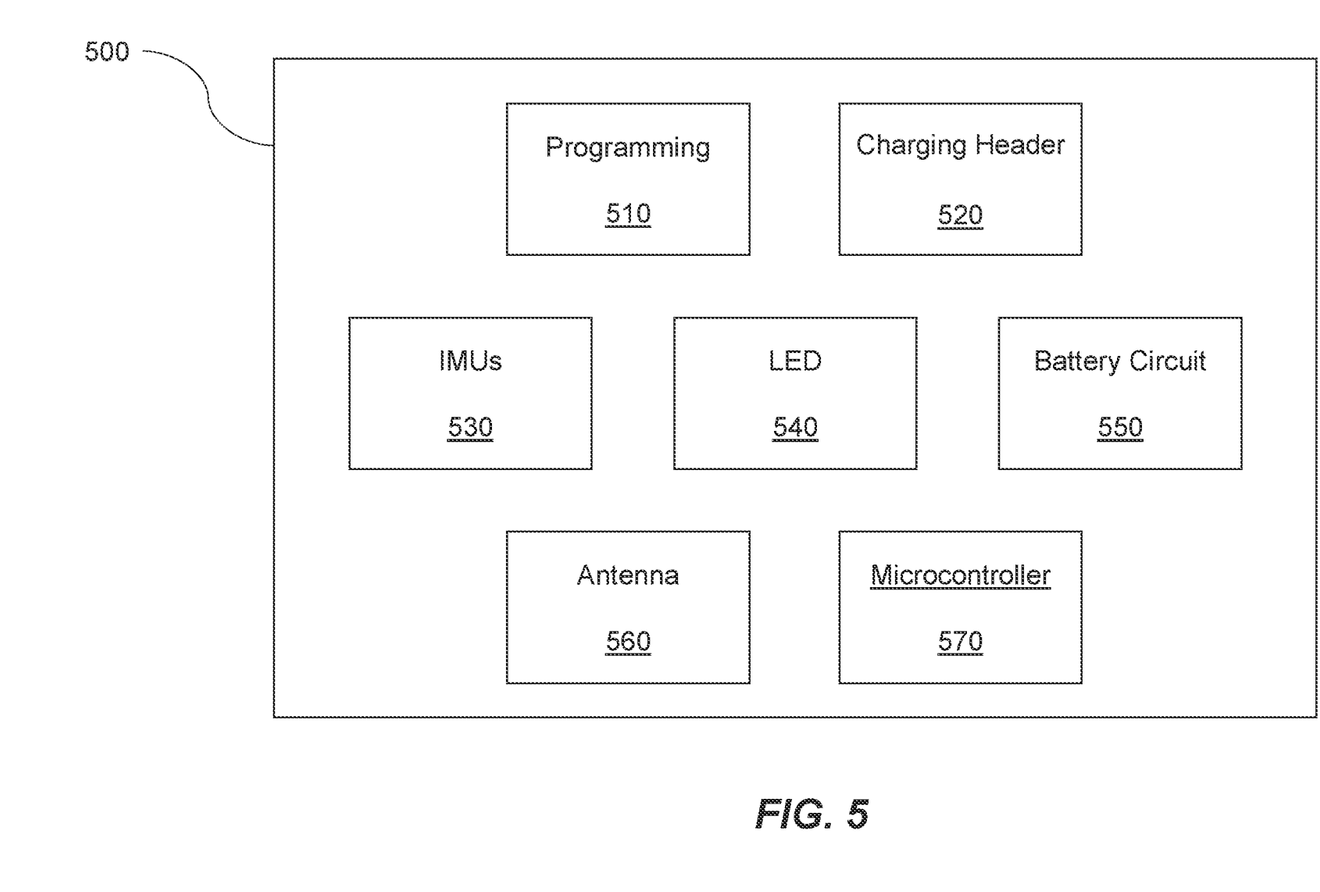
FIG. 5 illustrates a schematic diagram of a circuit board in accordance with embodiments of the present disclosure.

FIG. 5 illustrates a schematic block diagram of a circuit board in accordance with embodiments of the present disclosure. As discussed above, recess 400 may be configured to house at least one electronic component. The at least one electronic component may include a custom circuit board 500. Generally, circuit board 500 may collect and record motion data associated with movement of sports equipment which is attached to motion analyzer 100. Circuit board 500 may then process and transmit the motion data to a user device.

Circuit board 500 may include at least one programming pin 510. Programming pin 510 may be configured for connection to an external device, such as a computer, mobile device, or tablet, among other options. Programming pin 510 may function to upload firmware to circuit board 500.

Circuit board 500 may contain a charging header 520, Charging header 520 may be configured to receive any known charging means, including but not limited to micro-USC, USB-C, lightning charger, or wireless induction charging, among other options. Charging header 520 may transmit power obtained from a power source to the battery. In some embodiments, charging header 520 may be accessible via charging port 135.

Circuit board 500 may include at least one inertial measurement unit (IMU) 530 for collecting motion data in relation to the movement of the sports equipment during a session. The at least one Mini 530 may include a 3-axis accelerometer for collecting acceleration data relative to motion analyzer 100 as it is in use. The 3-axis accelerometer may measure instantaneous acceleration. In some embodiments, the 3-axis accelerometer may measure an average acceleration over a defined length of time. The acceleration data collected by the 3-axis accelerometer may be output to a microcontroller 570. The acceleration data may be aggregated and parsed by microcontroller 570. The acceleration data may be processed in combination with other IMU data to recreate the motion of motion analyzer 100 on a user interface of a user device.

The at least one IMU 530 may further include a 3-axis magnetometer for collecting acceleration data corresponding to motion analyzer 100 as motion analyzer 100 is in use. The 3-axis magnetometer may measure instantaneous magnetic field. In some embodiments, the 3-axis magnetometer may measure an average magnetic field over a defined length of time. The acceleration data collected by the 3-axis accelerometer may be output to microcontroller 570. The acceleration data may be aggregated and parsed by microcontroller 570. The acceleration data may be processed in combination with other IMU data to recreate the motion of motion analyzer 100 on a user interface of a user device.

The at least one IMU 530 may further include a 3-axis gyroscope for collecting angular rate of change data corresponding to motion analyzer 100 as motion analyzer 100 is in use. The angular rate of change data collected by the 3-axis gyroscope may be output to microcontroller 570. The angular rate of change data may be aggregated and parsed by microcontroller 570. The acceleration data may be processed in combination with other IMU data to recreate the motion of motion analyzer 100 on a user interface of a user device.

In some embodiments, circuit board 500 may contain an LED light 540 which may turn "on" to indicate that the battery needs to be charged.

Circuit board 500 may be connected to at least one battery circuit 550. The at least one battery circuit 550 may include at least one rechargeable battery which may be recharged by any known connection means, including but not limited to micro-USB, USB-C, lightning charger, or wireless induction charging, among other options. Battery circuit 550 may be configured to control the voltage and amperage of electricity flowing into the battery and protect circuit board 500 from undercharge or overcharge. Battery circuit 550 may further report battery level information to microcontroller 570. If the battery level is low, microcontroller 570 may transmit this information to a user device via RF or other wireless protocols.

Circuit board 500 may include at least one antenna 560. At least one antenna 560 may transmit the processed data from microcontroller 570 to an external device, such as a computer, mobile device, tablet, or external display, among other options. Antenna 560 may also receive data from an external device and relay the data to microcontroller 570. Antenna 560 may transmit and receive data via RF, Bluetooth™, Zigbee™, or WiFi, among other wireless protocols. In some embodiments, data may be transmitted and/or received to/from circuit board 500 via a wired connection.

Circuit board 500 may further include at least one microcontroller 570. IMU data collected by the at least one IMU 530 may be transmitted to microcontroller 570. Microcontroller 570 may aggregate and parse the MU data received from the at least one IMU 530. In some embodiments, microcontroller 570 may contain at least one memory to store the data.

Microcontroller 570 may process the IMU data received from at least one IMU 530. The processed data may be transmitted to other electronic devices (e.g., smart phones, tablets, computers, or wearables, among other options) using radio frequency (RF) or other wireless protocols, such as WiFi or Bluetooth™, among other options. The processed data may include metrics relative to user performance. For example, the user may be a lacrosse player and the sports equipment may be a lacrosse stick. The processed data may inform the user of an angle of their shot relative to a given axis. The angular data may inform the user of ways to adjust their shot in order to conform to a more preferred angle. As another use example, the processed data may inform the user of a speed of their shot.

Figure 6:
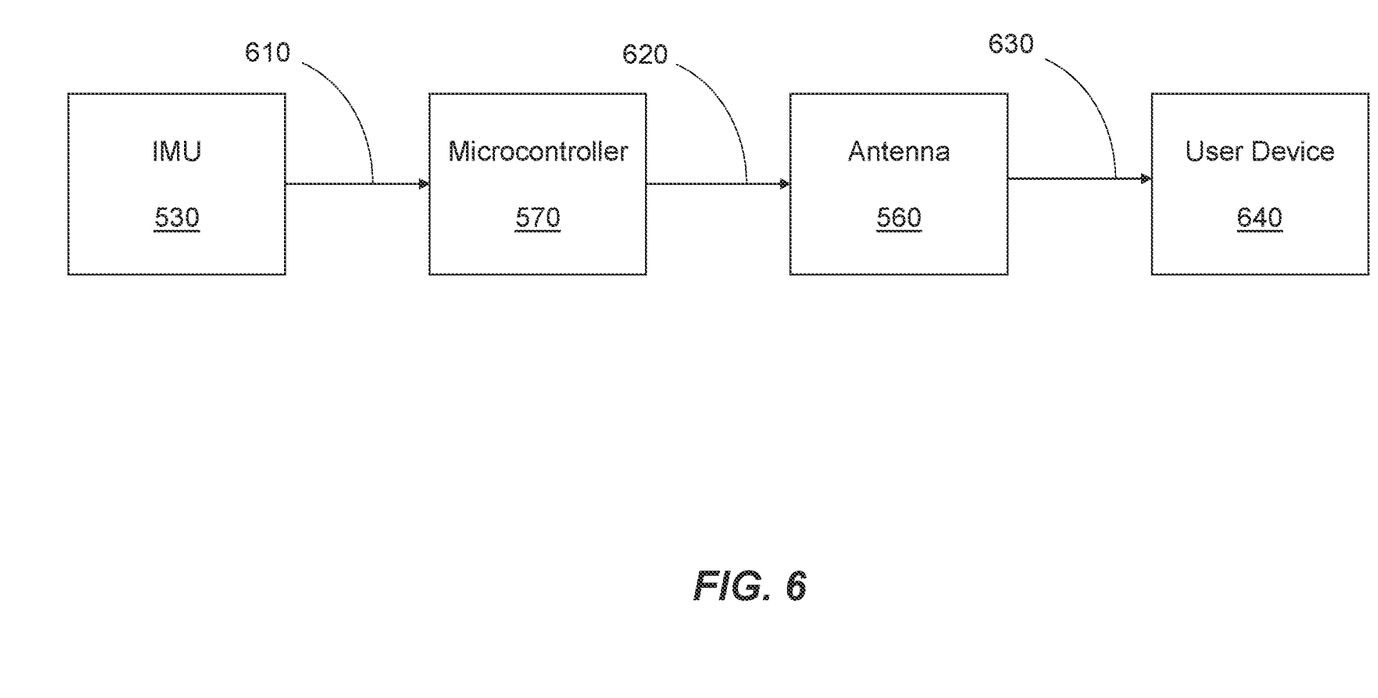
FIG. 6 illustrates a data flow diagram of the circuit board of FIG. 5.

FIG. 6 illustrates a data flow diagram of the circuit board of FIG. 5. IMUs 530 may collect and transmit motion data such as 3-axis acceleration, angular velocity and magnetic field.

Data collected by IMUs 530 may be transmitted to microcontroller 570 at 610. Microcontroller 570 may aggregate, parse and process the data. Microcontroller 570 may transmit the processed data to antenna 560 at 620 via Bluetooth™ or other wireless protocol. This data may then be transmitted from antenna 560 to a user device 640 at 630. User device 640 may be any mobile device, computer, external display, tablet, or wearable, among other options. The process data may then be used to inform the user of their performance during the session.

Figure 7:
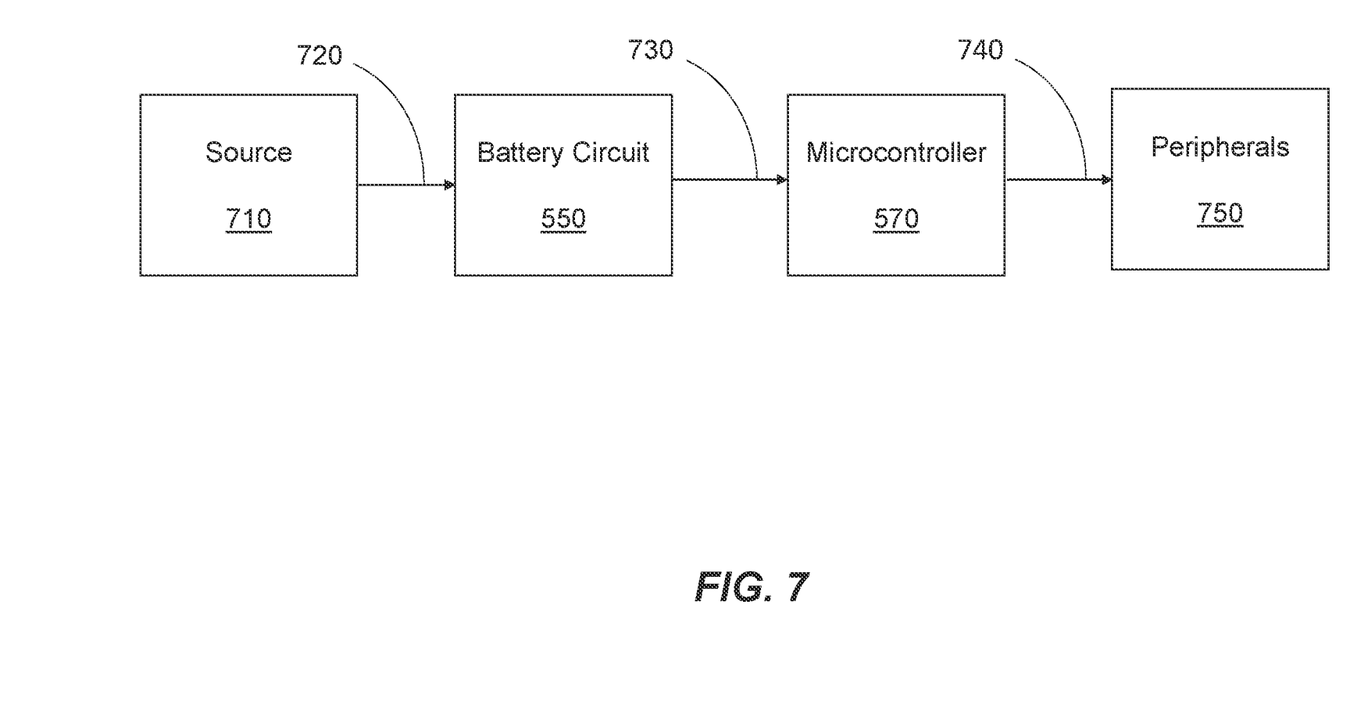
FIG. 7 illustrates a power flow diagram of the circuit board of FIG. 5.

FIG. 7 illustrates a power flow diagram of the circuit board of FIG. 5, Motion analyzer 100 may be connected to an external power source 710. Electricity from power source 710 may be transmitted to battery circuit 550 at 720. Battery circuit 550 may include a battery and a protective circuit. The protective circuit may prevent overcharge and undercharge of the battery. Voltage stored in battery circuit 550 may be transmitted to microcontroller 570 at 720. Power may further pass from microcontroller 570 to peripherals 750 of microcontroller 570 at 740. For example, power may be transmitted from microcontroller 570 to LED 540.

The present disclosure further provides for a method of manufacturing a motion analyzer. In general, the motion analyzer may be formed using any material deposit process, including but not limited to 3-D printing, fused filament fabrication (FFF), fused deposition modeling (FDM), or stereolithography (SLA), among other options.

Figure 8:
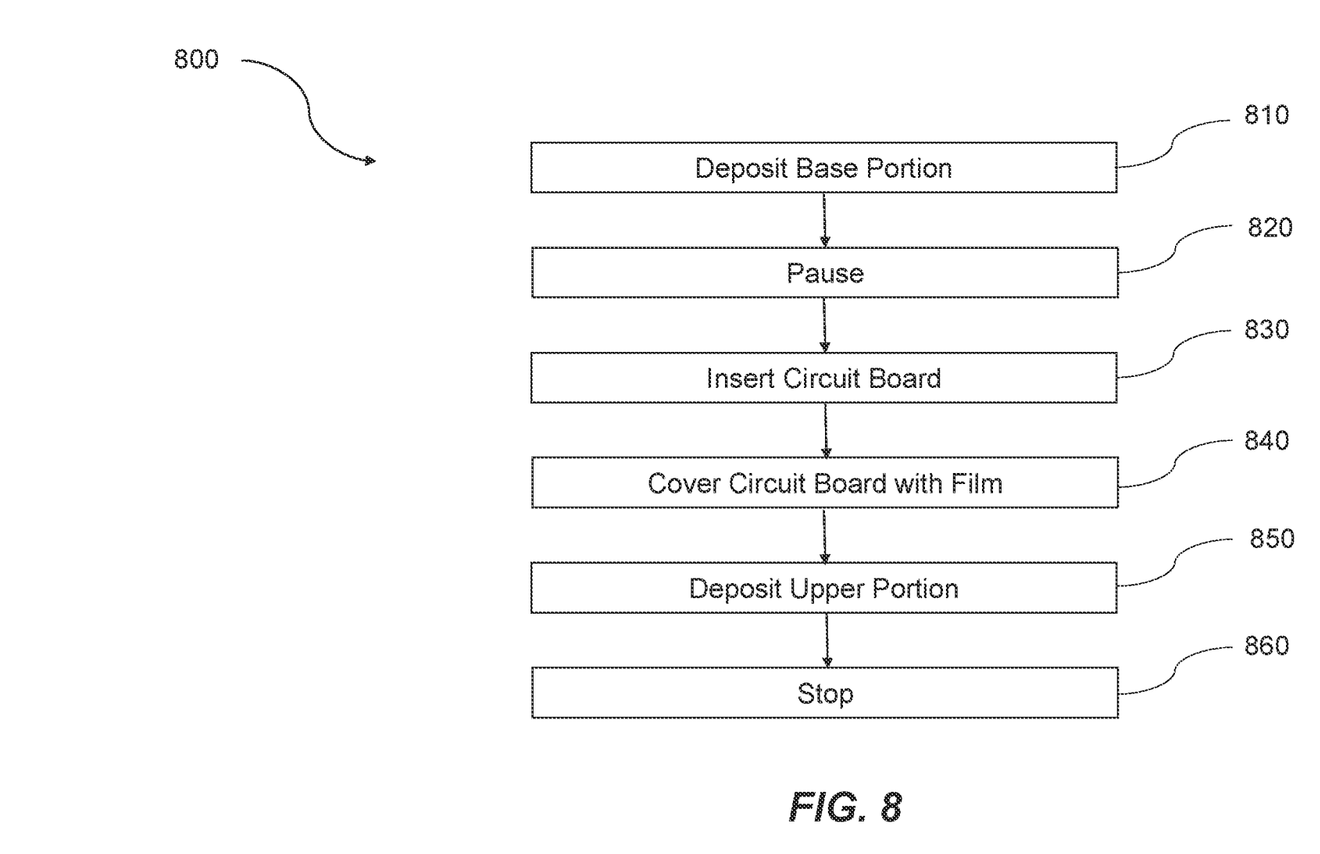
FIG. 8 illustrates a process flow diagram for a method of formation of a motion analyzer in accordance with embodiments of the present disclosure.

FIG. 8 illustrates a process 800 flow diagram for a method of formation of a motion analyzer in accordance with embodiments of the present disclosure. In some embodiments, the motion analyzer may be motion analyzer 100. Prior to process 800, a user may determine the desired dimensions of base portion 105. Once the size and dimensions of base portion 105 have been determined, they may be uploaded to any suitable material deposit apparatus. Process 800 may be performed by any suitable material deposit apparatus, and may be carried out using methods including, but not limited to 3-D printing, FFF, FDM, or SLA, among other options. Process 800 may be performed to manufacture motion analyzer 800.

Process 800 may include depositing the materials which form base portion 105. The material deposit apparatus will print according to the dimensions determined by the user.

Process 800 may include pausing deposition at 820. When the base portion 105 is finished forming, deposition may pause. The base portion 105 may be allowed to cool and harden.

Process 800 may include inserting a circuit board into the recess of base portion 105 at 830. When base portion 105 has hardened, a circuit board may be placed in the recess of base portion 105. In some embodiments, the circuit board may be circuit board 500.

Process 800 may include covering the circuit board with a film at 840. A film of thermoplastic material may be placed over the circuit to protect the electronic components when material deposition resumes. In some embodiments, no film is placed over the electronic components.

Process 800 may include depositing the materials which form upper portion 110 at 850. Once the circuit board has been inserted in the recess of base portion 105, material deposition may resume. Material deposition will continue according to the specifications determined by the user.

Process 800 may stop at 860. When upper portion 110 is finished forming, material deposition may stop, and upper portion 110 may be allowed to cool and harden. In some embodiments, base portion 105 and upper portion 110 may be formed from two distinct materials. For example, base portion 105 may be formed from thermoplastic material. When base portion 105 has hardened and the circuit board has been inserted in the recess, upper portion 110 may be formed from an elastomeric material.

The disclosed method of manufacture is advantageous over existing methods as it allows for motion analyzer 110 to be formed as one unitary piece. This provides for easy assembly and packaging. When the end user wishes to use the motion analyzer, they may simply press motion analyzer 100 on to a corresponding piece of sports equipment.

Figure 9:
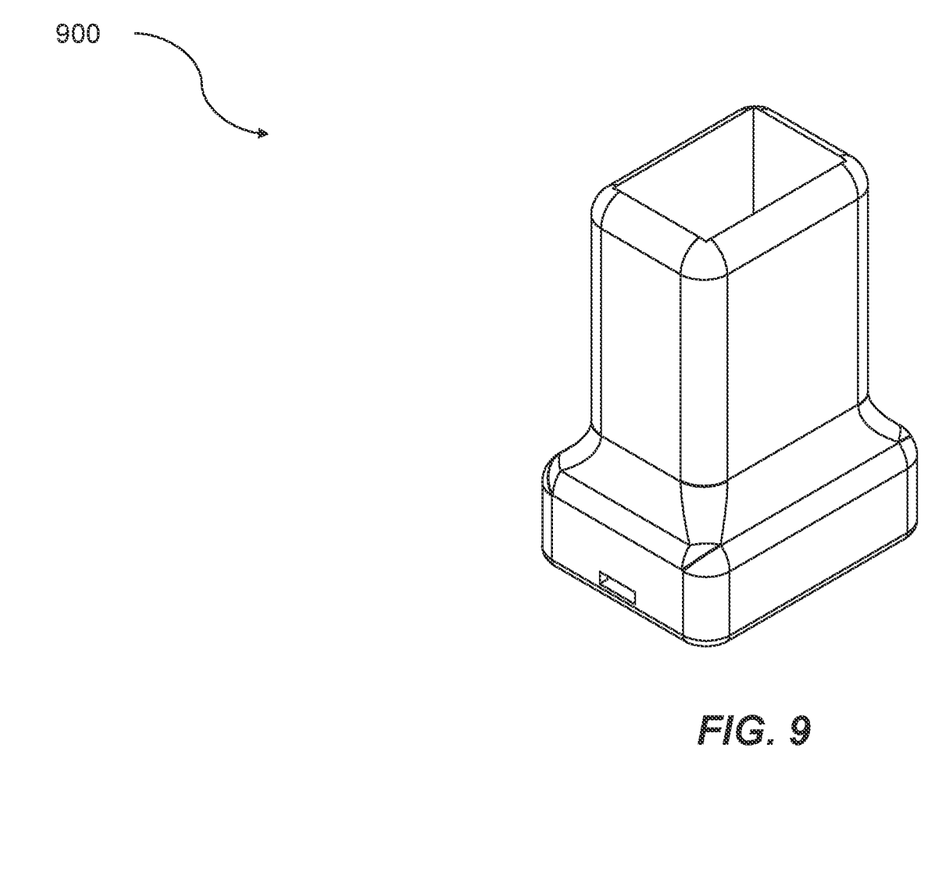
FIG. 9 illustrates a perspective view of a motion analyzer in accordance with embodiments of the present disclosure.

FIG. 9 illustrates a perspective view of a motion analyzer in accordance with embodiments of the present disclosure. As can be seen, motion analyzer 900 may be configured for attachment to a hockey stick.

Figure 10:
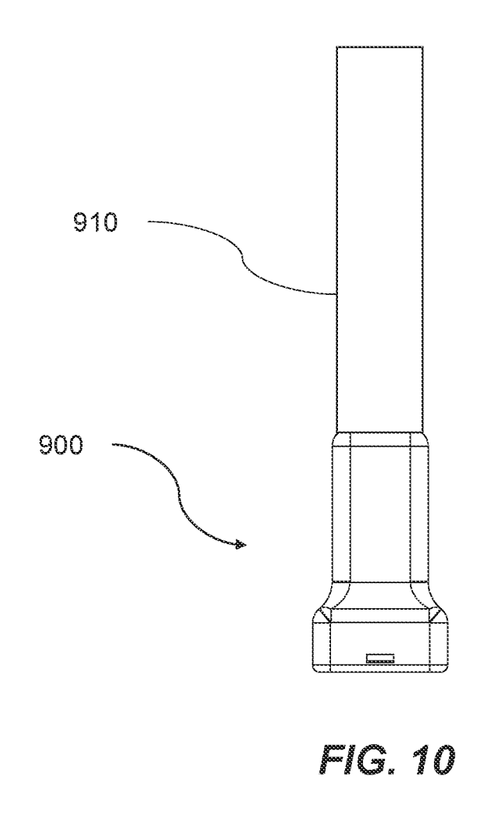
FIG. 10 illustrates a plane view of a motion analyzer in accordance with embodiments of the present disclosure.

FIG. 10 illustrates a plane view of a motion analyzer in accordance with embodiments of the present disclosure. As can be seen, motion analyzer 900 may be attached to sports equipment 910. In some embodiments, sports equipment 910 may be a hockey stick.

What is claimed is:

1. A motion analyzer for sports equipment, the motion analyzer comprising:
    a base portion, wherein the base portion defines a recess;
    at least one circuit board housed within the recess; and
    an upper portion connected to the base portion, wherein the upper portion defines a channel configured to receive a piece of sports equipment, and wherein the base portion and the upper portion are formed as a unitary structure.

2. The motion analyzer of claim 1, wherein the at least one circuit board further comprises at least one inertial measurement unit.

3. The motion analyzer of claim 2, wherein the at least one inertial measurement unit includes at least one selected from the group consisting of a 3-axis gyroscope, a 3-axis magnetometer, and a 3-axis accelerometer.

4. The motion analyzer of claim 3, wherein the at least one circuit board further comprises a microcontroller, wherein the microcontroller is configured to aggregate motion data collected by the at least one inertial measurement unit.

5. The motion analyzer of claim 1, wherein the motion analyzer comprises a thermoplastic material.

6. The motion analyzer of claim 1, wherein the motion analyzer comprises an elastomeric material.

7. The motion analyzer of claim 1, wherein the base portion further comprises a charging port, wherein the charging port defines an opening which leads to the circuit board.

8. The motion analyzer of claim 1, wherein the upper portion has a curved cross-section.

9. The motion analyzer of claim 1, wherein the upper portion has a polygonal cross-section.

10. The motion analyzer of claim 1, wherein the channel is configured for attachment to a lacrosse stick.

11. The motion analyzer of claim 1, wherein the channel is configured for attachment to a hockey stick.

12. A method of manufacturing a motion analyzer for sports equipment, the method comprising:
depositing a material to form a base portion of the motion analyzer, wherein the base portion defines a recess;
pausing material deposition; and
depositing a material to form an upper portion of the motion analyzer, wherein the upper portion defines a channel configured for attachment to sports equipment.

13. The method of claim 12, wherein a circuit board is inserted into the recess after material deposition has been paused.

14. The method of claim 13, wherein a film of material is placed over the circuit board.

15. The method of claim 12, wherein the base portion and upper portion are formed separately and attached after cooling of each portion.

16. The method of claim 12, wherein the base portion and upper portion are formed of distinct materials.

17. The method of claim 12, wherein the base portion and upper portion are formed of the same material.

18. The method of claim 12, wherein the motion analyzer is formed as one unitary, continuous structure.

19. A motion analyzer for attachment to sports equipment, the motion analyzer comprising:
a thermoplastic base portion, wherein the base portion defines a recess;
a circuit board housed within the recess, wherein the circuit board comprises a charging header;
a charging port on the base portion, wherein the charging port defines an opening which leads to the charging header;
a film of thermoplastic material covering the circuit board; and
an upper portion connected to the base portion, wherein the upper portion defines a channel and is configured to receive a lacrosse stick, and wherein the base portion and the upper portion are formed as a unitary structure.

* * * * *